United States Patent
Whytock

(10) Patent No.: US 10,445,710 B2
(45) Date of Patent: Oct. 15, 2019

(54) SECURITY DEVICE KEY MANAGEMENT

(71) Applicant: NCR CORPORATION, Duluth, GA (US)

(72) Inventor: Alexander William Whytock, Scotland (GB)

(73) Assignee: NCR Corporation, Atlanta, GA (US)

( * ) Notice: Subject to any disclaimer, the term of this patent is extended or adjusted under 35 U.S.C. 154(b) by 532 days.

(21) Appl. No.: 14/468,770

(22) Filed: Aug. 26, 2014

(65) Prior Publication Data
US 2016/0063462 A1 Mar. 3, 2016

(51) Int. Cl.
| H04L 29/06 | (2006.01) |
| G06Q 20/10 | (2012.01) |
| G06Q 20/38 | (2012.01) |
| G07F 19/00 | (2006.01) |
| G06F 21/60 | (2013.01) |
| H04L 9/32 | (2006.01) |

(52) U.S. Cl.
CPC ....... *G06Q 20/1085* (2013.01); *G06F 21/604* (2013.01); *G06Q 20/3829* (2013.01); *G07F 19/201* (2013.01)

(58) Field of Classification Search
CPC ............ G06Q 20/1085; G06Q 20/3829; G06F 21/604; G07F 19/201
USPC .............................................. 705/71; 713/150
See application file for complete search history.

(56) References Cited

U.S. PATENT DOCUMENTS

| 6,684,334 | B1 * | 1/2004 | Abraham | G06Q 20/02 235/379 |
| 7,110,986 | B1 * | 9/2006 | Zajkowski | G06Q 20/108 705/42 |
| 7,121,460 | B1 * | 10/2006 | Parsons | G06Q 20/341 235/379 |
| 7,418,592 | B1 * | 8/2008 | Zajkowski | G06Q 20/341 380/277 |
| RE40,694 | E * | 3/2009 | Davis | H04L 9/06 380/28 |
| 8,090,663 | B1 * | 1/2012 | Zajkowski | G06Q 20/108 705/70 |
| 8,608,057 | B1 * | 12/2013 | Crews | G06F 21/57 235/379 |
| 2005/0160050 | A1 * | 7/2005 | Payne | G06Q 20/382 705/64 |
| 2006/0020788 | A1 * | 1/2006 | Han | G07F 9/026 713/165 |
| 2007/0055894 | A1 * | 3/2007 | Osaki | G06F 11/2071 713/193 |
| 2007/0154018 | A1 * | 7/2007 | Watanabe | H04L 63/0428 380/273 |
| 2009/0077374 | A1 * | 3/2009 | Schwarz | G06Q 20/3829 713/156 |
| 2010/0031021 | A1 * | 2/2010 | Arnold | H04L 9/0637 713/155 |
| 2010/0044433 | A1 * | 2/2010 | Wankmueller | G06Q 20/3278 235/381 |

(Continued)

Primary Examiner — Gary S Gracia
(74) Attorney, Agent, or Firm — Schwegman, Lundberg & Woessner

(57) ABSTRACT

A method includes using a cryptographic infrastructure via a security processor in a device to communicate with a host, and managing, via the security processor, a cryptographic relationship with a security peripheral coupled to the security processor independent of the cryptographic infrastructure used to communicate with the host.

19 Claims, 4 Drawing Sheets

(56) References Cited

U.S. PATENT DOCUMENTS

| | | | |
|---|---|---|---|
| 2010/0080393 A1* | 4/2010 | Feather | H04L 9/0827 380/278 |
| 2010/0180118 A1* | 7/2010 | Nakatsugawa | G06F 21/72 713/169 |
| 2010/0254285 A1* | 10/2010 | Okano | H04L 12/2827 370/254 |
| 2013/0212024 A1* | 8/2013 | Mattsson | G06Q 20/405 705/64 |
| 2013/0332735 A1* | 12/2013 | Luo | H04L 9/3273 713/169 |

\* cited by examiner

300 ─┐

310

USE CRYPTOGRAPHIC INFRASTRUCTURE BETWEEN HOST AND ATM SECURITY PROCESSOR

320

USE SECURITY PROCESSOR TO MANAGE CRYPTOGRAPHIC RELATIONSHIP WITH A SECURITY PERIPHERAL DEVICE

USE SECURITY PROCESSOR OF ATM TO SECURELY COMMUNICATE WITH A REMOTE HOST USING HOST PROVIDED KEY FOR FIRST CRYPTOGRAPHIC KEY INFRASTRUCTURE

420

SECURITY PROCESSOR MANAGES SECOND CRYPTOGRAPHIC KEY INFRASTRUCTURE INCLUDING KEY DISTRIBUTION TO PERIPHERAL DEVICE INDEPENDENT OF FIRST CRYPTOGRAPHIC KEY INFRASTRUCTURE

*Fig. 4*

SECURITY DEVICE KEY MANAGEMENT

BACKGROUND

Increasingly consumers are conducting financial transactions through Self-Service Terminals (SSTs) without the assistance of a clerk. In fact, in many cases these transactions are conducted without any individual in the vicinity of the SSTs; other than, perhaps, a security camera integrated into the SSTs or in proximity to the SSTs.

The most common SST transaction occurs by a customer at an Automated Teller Machine (ATM). Contrary to what the general public believes, ATMs can be compromised and in some ways in a manner that takes advantage of inherent security holes of existing ATMs.

SUMMARY

A method includes using a cryptographic infrastructure via a security processor in a device to communicate with a host, and managing, via the security processor, a cryptographic relationship with a security peripheral coupled to the security processor independent of the cryptographic infrastructure used to communicate with the host.

In a further embodiment, a method includes communicating using a first cryptographic key infrastructure on a security processor of a self-service terminal to securely communicate with a remote host system, wherein the host system provides a key for encrypted data, and managing, via the security processor, second cryptographic key infrastructure with a security peripheral coupled to the self-service terminal, wherein managing the second cryptographic key infrastructure comprises managing distribution of the host key to the security peripheral independent of the first cryptographic key infrastructure used to communicate with the host.

In yet a further embodiment, a self-service terminal includes a security processor, a network connector coupled to the security processor to provide communications with a remote host, a peripheral security device connector coupled to the security processor to provide communications with a peripheral security device, and a computer readable storage device coupled to the security processor and having a program stored thereon for execution by the security processor to encrypt communications with the host using a first cryptographic key based security infrastructure and encrypt communications with a peripheral security device via the peripheral security device connector using a second cryptographic key based security infrastructure independent from the first cryptographic key based security infrastructure.

BRIEF DESCRIPTION OF THE DRAWINGS

FIG. 3 is a flowchart illustrating a method of a self-service terminal communicating with multiple peripheral devices according to an example embodiment.

FIG. 4 is a flowchart illustrating a method of a self-service terminal communicating with multiple peripheral devices according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media or computer readable storage device such as one or more memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A self-service terminal uses a cryptographic infrastructure via a security processor in a device to communicate with a host. The security processor also manages a cryptographic relationship with a security peripheral coupled to the security processor independent of the cryptographic infrastructure used to communicate with the host.

Figure 1:
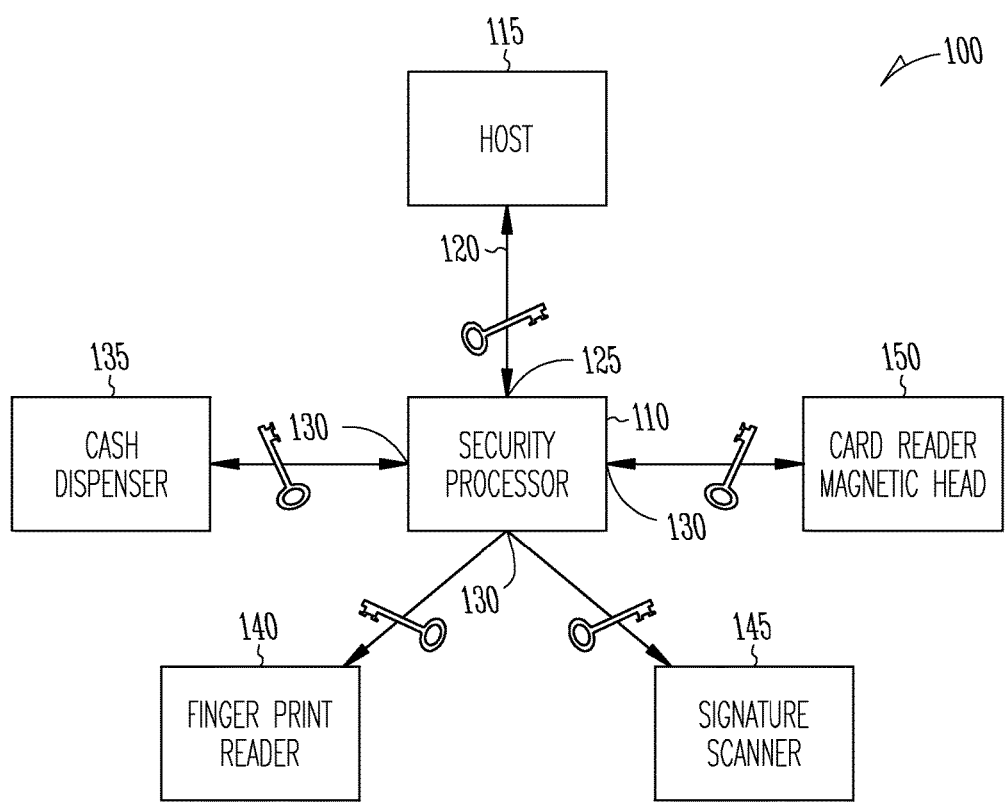
FIG. 1 is a block diagram of a self-service terminal securely communicating with a host and multiple security peripheral devices using independent key encryption infrastructures according to an example embodiment.

FIG. 1 is a block diagram of a system 100 that includes a self-service terminal 110 such as an automated teller machine or ATM. While an ATM is described, the description is also applicable to any enterprise providing Self-Service Terminals (SSTs). The ATM includes a security processor, such as a security co-processor to a main ATM processor. The security processor may also be an encrypting personal identification number (PIN) pad or encrypting touch screen. The security processor handles encryption of communications with a remote host 115 coupled by a network connection 120. The self-service terminal 110 includes a network connector 125, such as a network card to couple to the network connection 120.

In one embodiment, the security processor executes a first key encryption infrastructure and obtains a key from the host 115 to use in exchanging data securely with the host 115. The first key encryption infrastructure may utilize an ASC X9 TR 34-2013 asymmetric encryption infrastructure utilizing at least one key provided by the host, or otherwise obtained. In various embodiments, the first key encryption infrastructure is a standardized key encryption infrastructure approved for use in ATM machines by regulatory agencies, such as the PCI standard for the ATM industry.

The ATM 110 also has one or more connectors 130 to couple to one or more security peripheral devices, such as a cash dispenser 135, finger print reader 140, signature scanner 145, and card reader 150. Each of the security peripheral devices may utilize a second or further encryption infrastructure. For example, cash dispenser 135 may utilize an ASC X9 TR-31 2010 key encryption infrastructure, also managed by self-service terminal 110 separately from the first key encryption infrastructure. The host need not have knowledge of the second or further key encryption infrastructure and need not supply or manage any keys associated with such other key encryption infrastructures. Finger print reader 140 may also utilize the same ASC X9 TR 34-2013 asymmetric encryption infrastructure with the same or different key than that used by the host, but again, the infrastructure is separately managed and independent of the host such that the host need not be modified when a new security peripheral device is attached to the self-service terminal. Signature scanner 145 may also utilize the ASC X9 TR 34-2013 asymmetric encryption infrastructure, while card reader 150 may utilize a supplier proprietary symmetric key exchange infrastructure, both of which are managed by the self-service terminal independent of the host.

Figure 2:
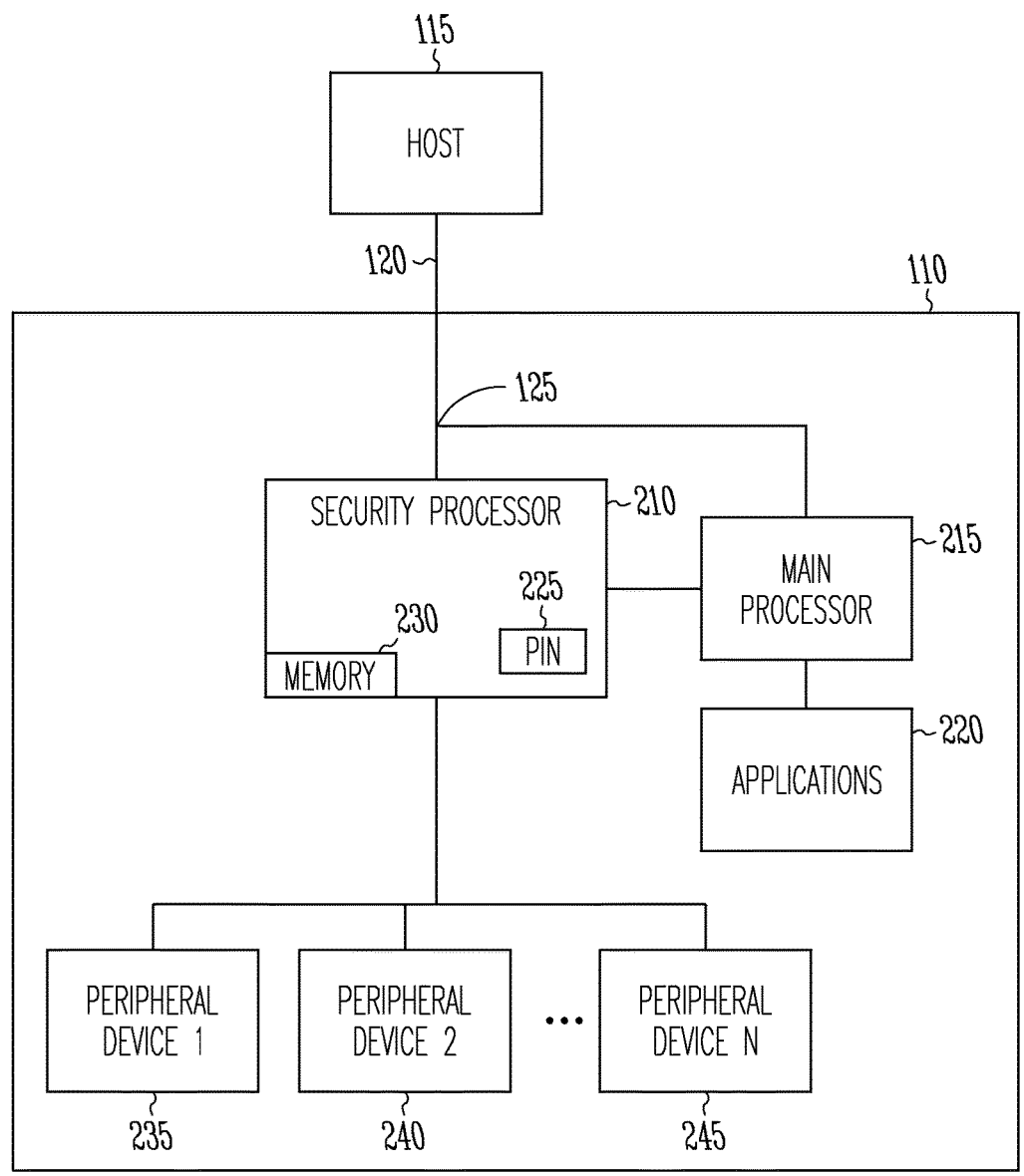
FIG. 2 is a block diagram illustrating further detail of a self-service terminal according to an example embodiment.

FIG. 2 is a block diagram illustrating further details of ATM 110 coupled to host 115. Some reference numbers are the same as those used in FIG. 1 to illustrate connections between the host 115 and ATM 110. ATM 110 is presented in greatly simplified form and is used to illustrate only those portions of components modified for purposes of managing independent key encryption infrastructures between the host and peripheral devices. ATM 110 is shown in FIG. 2 as including a security processor 210, which may be a co-processor to a main processor 215 that executes one or more applications indicated at 220. In one embodiment, the security processor 210 has a PIN pad 225 for use by users in entering a security code. The security processor 210 may also have a memory device 230 for storing programming to cause the security processor 210 to perform the encryption, decryption, key infrastructure management functions and other functions described herein. One or more security peripheral devices 235, 240, 245 are shown coupled to the security processor and utilize a key encryption infrastructure to communicate with the security processor 210 as previously described.

In one embodiment, the security processor 210 manages the cryptographic relationship between each security peripheral device using an internal key infrastructure while managing the cryptographic relationship between the security processor and the host system 115, which may be a customer system using an external customer key infrastructure. The two infrastructures are independent with the common and secure router being the security processor. Transactions between the security processor 210 and host 115 are compartmentalized within the security processor, as are transactions between the security processor 210 and security peripheral devices.

In various embodiments, security peripheral device transactions are performed within the boundaries of the security processor 210, which helps prevent sniffing of the key. The security peripheral and security processor 210, or at least the connections between them are within the confines of an ATM device 110, making it difficult to surreptitiously access the connections. By performing transactions with peripheral devices within the boundaries of the security processor 210, even if a peripheral device is compromised, such a compromise is prevented from enabling compromise of secure communications between the security processor and the host, as that key encryption infrastructure is separate and independent.

In operation, a security device, such as the security processor 210, will use a host encryption key for a particular function. If that function has been delegated to a peripheral security device, then the security device internally manages distribution of a key to the peripheral security device, independent of the host. If an ATM security processor detects a peripheral security device related to a supplemental function associated with the host key, then the ATM security processor 210 can use a proxy or surrogate key. The security processor 210 may use a standard asymmetric or symmetric key distribution, or a key distribution proprietary to the manufacturer of a peripheral security device. In one embodiment, an ATM can internally manage the additional peripheral security device and re-encrypt data received under the host key to send to peripheral security devices. In this way, future enhancements can be added to security infrastructures without impacting hosts.

FIG. 3 is a flowchart illustrating a method 300 of managing cryptographic infrastructures in an ATM. Method 300 includes using a cryptographic infrastructure via a security processor in a device to communicate with a host at 310. An encryption key may be used for communications between the host and security processor. The encryption key may be received by the security processor from the host, pre-programmed, or otherwise agreed upon by the host and security processor. At 320, the security processor manages a cryptographic relationship with a security peripheral coupled to the security processor independent of the cryptographic infrastructure used to communicate with the host.

In one embodiment, the security processor using the key, and sends the encrypted data to the security peripheral. The security processor may provide the encryption key to the security peripheral transparent to the host. In further embodiments, a different encryption key may be used to communicate between the security processor and the security peripheral. The same or different cryptographic infrastructure and cryptographic relationship encryption protocols may be used.

FIG. 4 is a flowchart illustrating a more detailed method 400 of managing cryptographic infrastructures in an ATM. At 410, a first cryptographic key infrastructure on a security processor of a self-service terminal is used to securely communicate with a remote host system, wherein the host system provides a key for encrypted data. At 420, the security processor manages second cryptographic key infrastructure with a security peripheral coupled to the self-service terminal. Managing the second cryptographic key infrastructure includes managing distribution of the host key to the security peripheral independent of the first cryptographic key infrastructure used to communicate with the host.

In one embodiment, the first and second cryptographic key infrastructures are the same and are managed independently of each other. The security peripheral may include one or more of a card reader, a cash dispenser, a finger print reader, a signature scanner, and an input device for receiving a customer entered personal identification number. Different security peripherals may communicate securely with the security processor via different and independent cryptographic key infrastructures, or in further embodiments, different security peripherals may communicate securely with the security processor via the same cryptographic key infrastructure, each of which is independent of the other.

Figure 5:
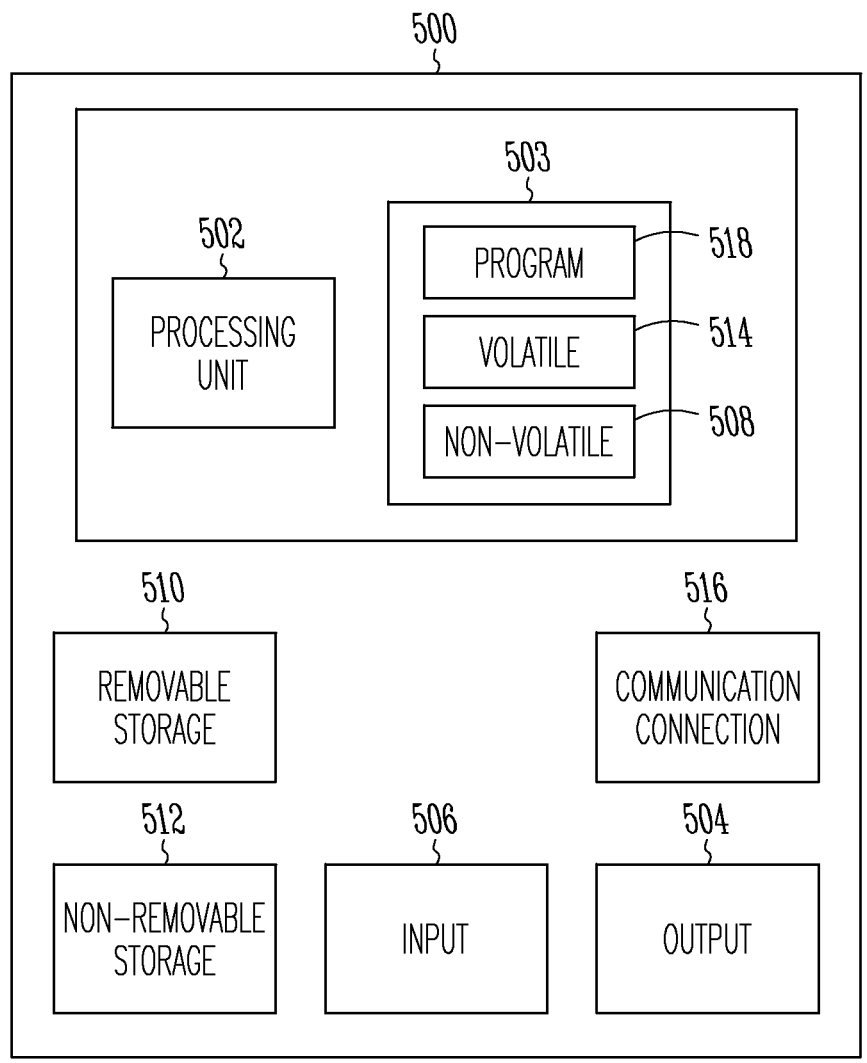
FIG. 5 is a block diagram illustrating a computer system for implementing a self-service terminal according to example embodiments.

FIG. 5 is a block schematic diagram of a computer system 500 to implement one or more computer based devices such as a host and ATM according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 500, may include a processing unit 502, memory 503, removable storage 510, and non-removable storage 512. Processing unit 502 may include a main processor and may also include a security co-processor in various embodiments. Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 500 may include or have access to a computing environment that includes input 506, output 504, and a communication connection 516. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 500. A hard drive, CD-ROM, and RAM are some examples of articles including a non-transitory computer-readable medium. For example, a computer program 518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 500 to provide generic access controls in a COM based computer network system having multiple users and servers.

EXAMPLES

1. A method comprising: using a cryptographic infrastructure via a security processor in a device to communicate with a host; and managing, via the security processor, a cryptographic relationship with a security peripheral coupled to the security processor independent of the cryptographic infrastructure used to communicate with the host.

2. The method of example 1 and further comprising using an encryption key for communications between the host and security processor.

3. The method of example 2 wherein the encryption key is received by the security processor from the host.

4. The method of example 3 and further comprising: encrypting data via the security processor using the key; and sending the encrypted data to the security peripheral.

5. The method of any of examples 2-4 and further comprising providing the encryption key to the security peripheral via the security processor transparent to the host.

6. The method of any of examples 2-5 and further comprising using a different encryption key to communicate between the security processor and the security peripheral.

7. The method of any of examples 1-6 wherein the cryptographic infrastructure and cryptographic relationship utilize different encryption protocols.

8. A method comprising: communicating using a first cryptographic key infrastructure on a security processor of a self-service terminal to securely communicate with a remote host system, wherein the host system provides a key for encrypted data; and managing, via the security processor, second cryptographic key infrastructure with a security peripheral coupled to the self-service terminal, wherein managing the second cryptographic key infrastructure comprises managing distribution of the host key to the security peripheral independent of the first cryptographic key infrastructure used to communicate with the host.

9. The method of example 8 wherein the first and second cryptographic key infrastructures are the same and are managed independently of each other.

10. The method of any of examples 8-9 wherein the security peripheral comprises a card reader.

11. The method of any of examples 8-10 wherein the security peripheral comprises a cash dispenser.

12. The method of any of examples 8-11 wherein the security processor comprises an input device for receiving a customer entered personal identification number.

13. The method of any of examples 8-12 and further comprises two different security peripherals.

14. The method of example 13 wherein the two different security peripherals communicate securely with the security processor via different and independent cryptographic key infrastructures.

15. The method of any of examples 13-14 wherein the two different security peripherals communicate securely with the security processor via the same cryptographic key infrastructure, each of which is independent of the other.

16. A self-service terminal comprising: a security processor; a network connector coupled to the security processor to provide communications with a remote host; a peripheral security device connector coupled to the security processor to provide communications with a peripheral security device; and a computer readable storage device coupled to the security processor and having a program stored thereon for execution by the security processor to encrypt communications with the host using a first cryptographic key based security infrastructure and encrypt communications with a peripheral security device via the peripheral security device connector using a second cryptographic key based security infrastructure independent from the first cryptographic key based security infrastructure.

17. The self-service terminal of example 16 wherein the first and second cryptographic key infrastructures are the same, utilize a same key, and are managed independently of each other.

18. The self-service terminal of any of examples 16-17 and further comprising two different security peripherals communicating securely with the security processor via different and independent cryptographic key infrastructures.

19. The self-service terminal of example 18 wherein the two different security peripherals communicate securely with the security processor via the same cryptographic key infrastructure, each of which is independent of the other.

20. The self-service terminal of any of examples 18-19 and further comprising security peripheral selected from the group consisting of a cash dispenser, finger print reader, signature scanner, and card reader.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:

using a first cryptographic infrastructure to communicate with a host via a security processor in a device to establish a first cryptographic relationship between the security processor and the host, including obtaining a first cryptographic key associated with the first cryptographic relationship from the host; separately managing in the device, via the security processor, a second cryptographic relationship with a security peripheral coupled to the security processor using a second cryptographic infrastructure independent of the first cryptographic infrastructure, including obtaining a second cryptographic key associated with the second cryptographic relationship from a source other than the host by the security processor, and sending the second cryptographic key to the security peripheral independently of the host by the security processor, wherein the device is a self-service terminal that includes the security processor and a main processor the executes applications on the self-service terminal;

and managing, by the security processor, multiple peripherals of the self-service terminal with a different cryptographic infrastructure and different cryptographic key managed for each one of the multiple peripherals, wherein the different cryptographic infrastructures and different cryptographic keys are used for the multiple peripherals of the self-service terminal to communicate with the security processor via a network card coupled to a network connection.

2. The method of claim 1 and further comprising using an encryption key for communications between the host and the security processor.

3. The method of claim 2 wherein the encryption key is received by the security processor from the host.

4. The method of claim 3 and further comprising:

encrypting data via the security processor using the key; and sending the encrypted data to the security peripheral.

5. The method of claim 2 and further comprising providing the encryption key to the security peripheral via the security processor transparent to the host.

6. The method of claim 2 and further comprising using a different encryption key to communicate between the security processor and the security peripheral.

7. The method of claim 1 wherein the first and the second cryptographic infrastructures utilize different encryption protocols.

8. A method comprising:

communicating using a first cryptographic key infrastructure on a security processor of a self-service terminal to securely communicate with a remote host system, wherein the host system provides a host key for encrypted data;

executing, by a main processor of the self-service terminal, applications that process on the self-service terminal, wherein the main processor is separate and independent from the security processor of the self-service terminal;

separately managing in the self-service terminal, via the security processor, a second cryptographic key infrastructure independently of the first cryptographic key infrastructure, including obtaining another key associated with the second cryptographic relationship from a source other than the host by the security processor, and sending the second cryptographic key to the security peripheral independently of the host by the security processor; and managing, by the security processor, multiple peripheral of the self-service terminal with a different cryptographic key infrastructure managed for each one of the multiple peripherals, wherein the different cryptographic infrastructures and different cryptographic keys are used for the multiple peripherals of the self-service terminal to communicate with the security processor via a network card coupled to a network connection.

9. The method of claim 8 wherein the security peripheral comprises a card reader.

10. The method of claim 8 wherein the security peripheral comprises a cash dispenser.

11. The method of claim 8 wherein the security processor comprises an input device for receiving a customer entered personal identification number.

12. The method of claim 8 and further comprises two different security peripherals.

13. The method of claim 12 wherein the two different security peripherals communicate securely with the security processor via different and independent cryptographic key infrastructures.

14. The method of claim 12 wherein the two different security peripherals communicate securely with the security processor via the same cryptographic key infrastructure, each of which is independent of the other.

15. A self-service terminal comprising:

a security processor;

a main processor;

a network connector coupled to the security processor to provide communications with a remote host;

a peripheral security device connector coupled to the security processor to provide communications with a peripheral security device; and a computer readable storage device coupled to the security processor and having a program stored thereon for execution by the security processor to separately encrypt in the self-service terminal communications with the host using a first cryptographic infrastructure using a first cryptographic key obtained from the host by the security processor and communications with a peripheral security device via the peripheral security device connector using a second cryptographic infrastructure independent from the first cryptographic key based security infrastructure using a second cryptographic key obtained from a source other than the host by the security processor, and to send the second cryptographic key to the peripheral security device independently of the host by the security processor prior to encrypting the communications with the peripheral security device via the peripheral security device connector, and manage, by the security processor, multiple peripherals of the self-service terminal with a different cryptographic infrastructure managed for each one of the multiple peripherals;

wherein the main processor is configured to execute applications that process on the self-service terminal and the different cryptographic infrastructures and different cryptographic keys are used for the multiple peripherals of the self-service terminal to communicate with the security processor via a network card coupled to a network connection.

16. The self-service terminal of claim 15 wherein the first and second cryptographic key infrastructures are the same, utilize a same key, and are managed independently of each other.

17. The self-service terminal of claim 15 and further comprising two different security peripherals communicating securely with the security processor via different and independent cryptographic key infrastructures.

18. The self-service terminal of claim 17 wherein the two different security peripherals communicate securely with the security processor via the same cryptographic key infrastructure, each of which is independent of the other.

19. The self-service terminal of claim 17 and further comprising security peripheral selected from the group consisting of a cash dispenser, finger print reader, signature scanner, and card reader.

\* \* \* \* \*